United States Patent
Amari et al.

(10) Patent No.: US 7,407,708 B2
(45) Date of Patent: Aug. 5, 2008

(54) HIGH-STRENGTH, CHEMICALLY RESISTANT LAMINAR FILM WITH LIMITED EXTRACTABLES

(75) Inventors: Mutsuhiro Amari, Kanagawa (JP); Yukio Hashimoto, Saitama (JP); Tsutomu Ogawa, Osaka (JP)

(73) Assignee: Entegris, Inc., Chaska, MN (US)

( * ) Notice: Subject to any disclaimer, the term of this patent is extended or adjusted under 35 U.S.C. 154(b) by 0 days.

(21) Appl. No.: 10/489,453

(22) PCT Filed: Sep. 18, 2002

(86) PCT No.: PCT/US02/29541

§ 371 (c)(1),
(2), (4) Date: Mar. 11, 2004

(87) PCT Pub. No.: WO03/024713

PCT Pub. Date: Mar. 27, 2003

(65) Prior Publication Data

US 2004/0214028 A1    Oct. 28, 2004

Related U.S. Application Data

(60) Provisional application No. 60/323,205, filed on Sep. 18, 2001.

(51) Int. Cl.
  *B32B 27/08* (2006.01)
  *B32B 27/28* (2006.01)
  *B32B 37/12* (2006.01)

(52) U.S. Cl. .............. 428/422; 428/473.5; 156/333
(58) Field of Classification Search ............. 428/422, 428/473.5; 156/333; 526/247
See application file for complete search history.

(56) References Cited

U.S. PATENT DOCUMENTS

| 2,946,763 A | 7/1960 | Bro |
| 3,819,594 A | 6/1974 | Holmes |
| 4,058,578 A | 11/1977 | Kuhls et al. ............. 525/276 |
| 4,801,506 A | 1/1989 | Motonari et al. ......... 428/421 |
| 4,840,998 A | 6/1989 | Shimizu |
| 4,879,362 A | 11/1989 | Morgan ................... 526/247 |
| 4,952,636 A | 8/1990 | Morgan |
| 5,006,411 A | 4/1991 | Motonari et al. ......... 428/421 |
| 5,011,727 A | 4/1991 | Kido et al. .............. 428/141 |
| 5,106,673 A | 4/1992 | Effenberger et al. ..... 428/216 |
| 5,763,082 A | 6/1998 | Kokumai |
| 6,011,113 A * | 1/2000 | Konabe ................... 524/805 |

FOREIGN PATENT DOCUMENTS

| JP | 08-034101 | 2/1996 |
| JP | 10-169562 | 6/1998 |
| JP | 2000-280402 | 10/2000 |
| JP | 2001-355568 | 12/2001 |
| JP | 2003-227467 | 8/2003 |

* cited by examiner

*Primary Examiner*—Ramsey Zacharia
(74) *Attorney, Agent, or Firm*—John E. Pillion; Timothy J. King

(57) ABSTRACT

A chemically resistant, extractable free, composite laminar film including polyimide, PFA and m-PTFE layers.

8 Claims, 1 Drawing Sheet

HIGH-STRENGTH, CHEMICALLY RESISTANT LAMINAR FILM WITH LIMITED EXTRACTABLES

This Application is the National Stage of International Application No. PCT/US02/29541, filed Sep. 18, 2002, which claims the benefit of U.S. Provisional Application No. 60/323,205, filed Sep. 18, 2001.

BACKGROUND OF THE INVENTION

1. Field of the Invention

This invention generally relates to high-strength, chemically-resistant laminar films; and specifically such films used in pump and valve diaphragms.

2. Background Information

Diaphragm pumps are used in pumping a wide variety of materials especially when the materials are abrasive, have high viscosity, consist of slurries that might damage other pump designs, have a high purity requirement or are not robust. These pumps are often air driven which is advantageous in pumping flammable liquids or in environments where electrically driven equipment could otherwise be hazardous. However, electrically or otherwise mechanically driven designs also find wide utility. Others are driven by incompressible fluids.

Due to the wide range of different materials these pumps are used to move, a correspondingly wide variety of materials are used in the pump construction. These include plastics, metals and composites. For the same reason the critical driving member of such pumps, the diaphragm, typically must be manufactured from a variety of materials.

Chemically resistant layers, such as those made of polytetrafluoroethylene (PTFE), are widely used in industry to protect sensitive parts of machinery or equipment from the corrosive effects of acids or other chemicals. One such use is in pump diaphragms commonly used with air or electrically driven diaphragm pumps. In such diaphragms, an outer PTFE overlay diaphragm is commonly used to protect an inner rubber diaphragm from materials that would cause rapid failure of the rubber part alone. In other cases, the PTFE provides the sole material of construction of the diaphragm.

Polyimide is very useful material for industrial use for machineries and parts because of it's mechanical strength, electrical property and chemical property. However, the tensile strength and endurance against the cycle-bending fatigue for polyimide membrane are easily reduced under certain conditions such as under strong acidic or strong basic media. Thus, a polyimide film alone cannot be used for the diaphragm application for feed pump using for microelectronics chemical such as photo resists and TARC. On the other hand, fluorinated resin including PTFE, FEP, or PFA have extremely high resistivity against any chemicals. However, the materials' respective low mechanical strengths are not satisfactory for the use.

Recently, there are several patents application regarding polyimide and fluorinated resin laminated composite films. One includes PCT Publication No. WO93/1493. It discloses a laminar film structure comprising a polyimide and a fluoropolymer. Such prior art discloses uses for such laminates such as endless belt, motor coil and cable. One of the methods reported in such prior art includes the dispersion of fluorinated resin in organic solvent that was then coated on both sides of polyimide film. The second method is heat-press-bonding method with polyimide and fluorinated resin powder. For either method, the obtained laminated films did not have enough peeling strength between two layers for pump diaphragm applications. Other methods reported included improving peeling strength between two layers by adding titanium complex into the fluorinated layer. This method is not also applicable for microelectronics use because the risk of contamination of metal from the titanium additive.

The preparation methods for laminated film describe above were not satisfied the requirements need for the microelectronics chemical feed pump application, which are high accuracy, cycle bending fatigue endurance, and not producing any contamination such as metal or particle from film fibrillation.

Blends of the fluoropolymer and the dissimilar layer themselves are in some cases employed as an intermediate layer to help bond the two layers together. European Patent Application 0523644 (Kawashima et al.) discloses a plastic laminate having a polyamide resin surface layer and a fluororesin surface layer. The reference recognizes the difficulties encountered when making laminates having a polyamide layer and a fluororesin layer because of the incompatibility of the two materials. The laminate of the reference is prepared by use of an intermediate layer composed of a blend of an aliphatic polyamide resin with a fluorine-containing graft copolymer.

U.S. Pat. No. 6,197,393 discloses a method of bonding substantially non-fluorinated polymeric material to a fluoropolymer utilizing a bonding composition comprising primary or secondary di- or poly-amine and a melt-processable, substantially non-fluorinated component.

It would be desirable to provide a laminar film that has both the mechanical strength and chemical resistant properties sufficient for use in valve and pump diaphragms.

SUMMARY OF THE INVENTION

This invention provides a laminar film that is chemically resistant, mechanically strong and free from extractables.

DESCRIPTION OF THE SPECIFIC EMBODIMENTS

Figure 1:
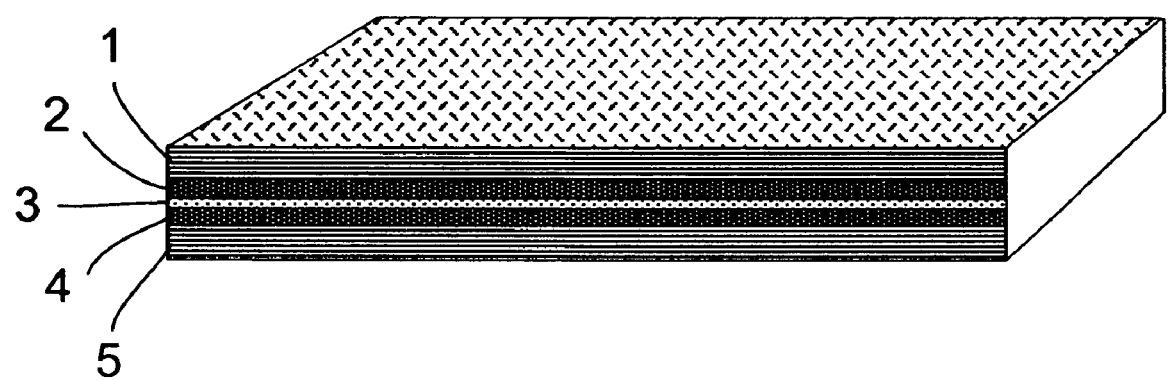
FIG. 1 illustrates a diaphragm of the present invention.

The present invention provides a laminated film that includes a m-PTFE layer 1, a PFA layer 2 and a polyimide layer 3. In a preferred embodiment, the laminated film is a "sandwich", in which the polyimide layer 3 is in the middle. This particular embodiment of the invention is set forth in FIG. 1. The figure includes a m-PTFE layer 1, a PFA layer 2 and a polyimide layer 3 as well as an additional PFA layer 4 and a m-PTFE layer 5.

The laminated film was prepared by heat-bonding the five layers of film materials. The materials were heated to the point where the individual layers became a single composite material.

The m-PTFE was a modified-Polytetrafluoroethylene that contained specific amounts of perfluoro alkyl residue on the main polymer chain. This layer is useful for acting as a barrier layer against chemicals penetrating through the film. The PFA (perfluoro alkylether) layers 2 and 4 serve as adhesives to fix the m-PTFE layers to the Polyimide layer 3. The Polyimide layer 3 contributes mechanical strength to the laminated film.

The present invention provides substantial advantages over the prior art. For example, improved cycle-bending fatigue resistance of fluorinated resin layer by using m-PTFE (modified Polytetrafluoroethylene) for fluorinated resin layer rather than standard PTFE. m-PTFE has reduced PTFE crystallinity and such reduced crystallinity reduces the chance of fibrillation of the resin after several thousand cycles of bending.

Another advantage of the present invention is its improved adhesion between the barrier layer and the mechanical layer. Use of the PFA layer 2 to adhere the polyimide layer 3 to the m-PTFE layer increases the resistance to peeling.

Another advantage of the present invention is that the use of a m-PTFE layer rather than a standard PTFE layer reduces the risk of particle contamination of chemicals by PTFE fibrillation.

Another advantage of the present invention is that the laminar film has excellent mechanical strength including tensile strength, cycle bending fatigue resistance and size stability from polyimide layer 3.

The laminar film of the present invention also benefits from the excellent chemical resistance properties of the m-PTFE layer or layers.

The invention claimed is:

1. A chemically resistant reduced extractable laminar film comprising:
   a polyimide film layer heat bonded to a first adhesive film layer consisting of PFA, said first adhesive film layer heat bonded to a first m-PTFE film layer having reduced crystallinity and an improved cycle bending fatigue resistance compared to standard PTFE, the polyimide layer, first adhesive film layer, and m-PTFE layer heated in said heat bonding to form a single composite material, the m-PTFE layer configured to be exposed to a fluid, said laminar film does not produce any contamination as metal or particles from film fibrillation after several thousand cycles of bending, wherein the first adhesive film layer bonds the first m-PTFE film layer to the polyimide film layer.

2. The laminar film of claim 1, further comprising an additional adhesive film layer heat bonded to a side of the polyimide film layer opposite the first adhesive film layer, said additional adhesive film layer heat bonded to an additional layer of m-PTFE, said additional adhesive film layer consisting of PFA and bonds the additional layer of m-PTFE film to the polyimide film layer.

3. The laminar film of claim 1, wherein said m-PTFE layer contains perfluoro alkyl residue on the main polymer chain.

4. A method for producing a chemically resistant reduced extractable laminar film, the method comprising:
   arranging a multi-layered sandwich of material in the following order:
   an m-PTFE film layer having reduced crystallinity, an adhesive film layer consisting of PFA, and a polyimide film layer; and
   heat bonding, the polyimide film layer, the adhesive film layer, and the m-PTFE film layer wherein said heat bonding forms a single composite material, and wherein the m-PTFE has reduced crystallinity and an improved cycle bending fatigue resistance compared to standard PTFE.

5. The method of claim 4 wherein said laminar film does not produce any contamination as metal or particles from film fibrillation after several thousand cycles of bending.

6. A chemically resistant reduced extractable laminar film consisting of:
   a polyimide film layer heat bonded to a first adhesive film layer consisting of PFA, said first adhesive film layer heat bonded to a first m-PTFE film layer having reduced crystallinity and an improved cycle bending fatigue resistance compared to standard PTFE, the polyimide layer, first adhesive film layer, and m-PTFE layer heated in said heat bonding to form a single composite material, the m-PTFE layer configured to be exposed to a fluid.

7. A chemically resistant reduced extractable laminar film consisting of:
   a polyimide film layer heat bonded to a first adhesive film layer consisting of PFA, said first adhesive film layer of PFA heat bonded to a first m-PTFE film layer having reduced crystallinity and an improved cycle bending fatigue resistance compared to standard PTFE, an additional adhesive film layer consisting of PFA heat bonded to a side of the polyimide film layer opposite the first adhesive film layer of PFA, said additional adhesive film layer of PFA heat bonded to an additional layer of m-PTFE having reduced crystallinity and an improved cycle bending fatigue resistance compared to standard PTFE, said additional adhesive film layer of PFA bonds the additional layer of m-PTFE film to the polyimide film layer; the polyimide layer, the first adhesive film layer of PFA, the additional adhesive layer of PFA, the additional layer of m-PTFE, and the m-PTFE layer heated in said heat bonding form a single composite material.

8. A method for producing a chemically resistant reduced extractable laminar film, the method consisting of:
   arranging a multi-layered sandwich of material in the following order:
   a first m-PTFE film layer having reduced crystallinity and improved cycle bending fatigue resistance compared to standard PTFE, an adhesive film layer consisting of PFA, a polyimide film layer, an additional adhesive film layer consisting of PFA, and an additional layer of m-PTFE having reduced crystallinity and improved cycle bending fatigue resistance compared to standard PTFE; and
   heat bonding, the first m-PTFE film layer, the adhesive film layer of PFA, the polyimide film layer, the additional adhesive film layer of PFA, and the additional layer of m-PTFE wherein said heat bonding forms a single composite material.

* * * * *